US007470911B2

(12) United States Patent
Yagi

(10) Patent No.: US 7,470,911 B2
(45) Date of Patent: Dec. 30, 2008

(54) PHOTOELECTRIC CONVERSION DEVICE AND RADIATION PHOTOGRAPHY APPARATUS

(75) Inventor: Tomoyuki Yagi, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 10/550,451

(22) PCT Filed: Apr. 20, 2004

(86) PCT No.: PCT/JP2004/005654

§ 371 (c)(1),
(2), (4) Date: Sep. 26, 2005

(87) PCT Pub. No.: WO2004/095833

PCT Pub. Date: Nov. 4, 2004

(65) Prior Publication Data

US 2006/0192130 A1 Aug. 31, 2006

(30) Foreign Application Priority Data

Apr. 22, 2003 (JP) ............................ 2003-117238

(51) Int. Cl.
*G01T 1/24* (2006.01)

(52) U.S. Cl. ................................................ 250/370.14

(58) Field of Classification Search ............ 250/370.09, 250/370.14, 252.1, 580; 378/114, 116; 257/53
See application file for complete search history.

(56) References Cited

U.S. PATENT DOCUMENTS 5,515,411 A 5/1996 Tonami et al. ............. 378/98.8
5,841,180 A 11/1998 Kobayashi et al. .......... 257/448
5,869,837 A 2/1999 Huang ................... 250/370.09
5,962,856 A * 10/1999 Zhao et al. ............. 250/370.09
6,021,173 A * 2/2000 Brauers et al. ............. 378/98.8
6,075,256 A 6/2000 Kaifu et al. ................... 257/53
6,512,543 B1 1/2003 Kuroda et al. ............... 348/302
7,026,625 B2 * 4/2006 Nomura et al. ........ 250/370.11
2005/0109927 A1 5/2005 Takenaka et al. ......... 250/252.1
2005/0199834 A1 9/2005 Takenaka et al. ............ 250/580
2005/0200720 A1 9/2005 Kameshima et al. ..... 348/220.1

(Continued)

FOREIGN PATENT DOCUMENTS

DE 44 10 269 A1 3/1994

(Continued)

OTHER PUBLICATIONS

Chinese Office Action dated Jul. 6, 2007 for corresponding Application No. 2004/0010840.0.

*Primary Examiner*—David P Porta
*Assistant Examiner*—Faye Boosalis
(74) *Attorney, Agent, or Firm*—Fitzpatrick, Cella, Harper & Scinto

(57) ABSTRACT

A sensor lower electrode of a MIS type photosensor is connected to a gate line distributed in a next line in a scanning direction through a refreshing capacitor. The MIS type photosensors of an (n−1)-th line are refreshed on the basis of an ON/OFF operation of TFTs accompanying a reading operation for a pixel column of an n-th line to thereby allow the refresh operation to be carried out every scanning line. Thus, it is possible to prevent a moving image from becoming unnatural due to the refresh operation as in the background art.

14 Claims, 11 Drawing Sheets

U.S. PATENT DOCUMENTS

| | | | | |
|---|---|---|---|---|
| 2005/0220269 | A1 | 10/2005 | Endo et al. | 378/114 |
| 2005/0220270 | A1 | 10/2005 | Kameshima et al. | 378/116 |
| 2005/0264665 | A1 | 12/2005 | Endo et al. | 348/308 |

FOREIGN PATENT DOCUMENTS

| | | | |
|---|---|---|---|
| EP | 0 066 421 | A2 | 6/1995 |
| EP | 0 865 197 | A2 | 9/1998 |
| EP | 0 778 983 | B1 | 5/2000 |
| JP | 7-63859 | A | 3/1995 |
| JP | 8-116044 | A | 5/1996 |
| JP | 10-125891 | A | 5/1998 |
| JP | 10-506230 | A | 6/1998 |
| JP | 10-257392 | A | 9/1998 |
| JP | 2000-323699 | A | 11/2000 |
| WO | WO 96/03776 | | 2/1996 |

* cited by examiner

PHOTOELECTRIC CONVERSION MODE

SATURATED STATE

REFRESH OPERATION

PHOTOELECTRIC CONVERSION DEVICE AND RADIATION PHOTOGRAPHY APPARATUS

TECHNICAL FIELD

The present invention relates to a photoelectric conversion device and a radiation photography apparatus, and more particularly to a device suitable for obtaining an image based on an electrical signal obtained through photoelectric conversion.

BACKGROUND ART

Conventionally, an image intensifier (I.I) is used for photographing an X-ray image, which is carried out in order to diagnose a digestive system including the stomach and the intestine, and the heart.

The image intensifier (I.I) is useful in a medical sight because a moving image obtained through the image intensifier is very effective. That is to say, if still images of internal organs always working are merely photographed, the obtained images are not ones that a doctor expects to obtain in some cases. Therefore, it is necessary to carry out the diagnosis using their moving images. In addition, since it is necessary that timing of photographing of the still image is judged while looking at the moving image, effectiveness of the moving image is very high in the medical care site.

The image intensifier (I.I), as shown in FIG. 7, includes a fluorescent screen 101 which is obtained by depositing cesium iodide (CsI) onto a glass surface by an evaporator, a cathode plate 102 disposed so as to face the fluorescent screen 101, an electron lens portion (anode plate) 103 for condensing electrons emitted from the cathode plate 102 to accelerate the condensed electrons, and an output surface 104 for converting an image of the electrons condensed by the electron lens portion 103 into a visible image to display the resultant image. Note that the output surface 104 is formed by depositing a phosphor onto an aluminum film by an evaporator.

X-rays 110 which are emitted from an X-ray source 111 to be transmitted through the human body 109 are first converted into an X-ray image by the fluorescent screen 101 obtained by depositing cesium iodide (CsI) onto the glass surface by the evaporator.

The X-ray image from the fluorescent screen (CsI) 101 is converted into an electron image by the cathode plate 102 facing the fluorescent screen 101.

The electron image is condensed and accelerated by the electron lens portion 103 to be applied to the output surface (fluorescent surface) 104 to thereby be converted into the visible image by the output surface (fluorescent surface) 104.

The image displayed on the output surface (fluorescent surface) 104 also can be displayed on a monitor 107 through observation with a TV camera 105 or a CCD camera.

However, such an image intensifier (I.I), in principle, has the following problems.

A first problem is such that since the electron lens is used, the image is distorted. A second problem is such that since there is a limit to a size of the electron lens and the cathode surface, a large field of view can not be obtained. A third problem is such that since the apparatus is of large scale, it is difficult to handle the apparatus in a small X-ray room.

On the other hand, in recent years, an X-ray image pickup device using a flat panel detector (hereinafter referred to as "an FPD" for short) has been made fit for practical use along with progress in the semiconductor technology, and is expected to be developed in the future.

Advantages of an X-ray image pickup device using the FPD are such that this X-ray image pickup device has sensitivity and image quality superior to those of an X-ray image pickup device using a film, management of an image becomes simple due to digitization of an image, a new diagnosis method based on an image processing can be established, and so forth. In addition to those advantages, the X-ray image pickup device using the FPD has such an excellent advantage as to be able to photograph a moving image as well as a still image.

Thus, if the FPD can be applied to an X-ray moving image, it is possible to realize an X-ray moving image photography apparatus with which there is obtained an image less in distortion than that obtained through the photographing with the image intensifier (I.I), and also there is obtained a field of view identical to that of a film having a large square size. Moreover, since the apparatus can be thinned as compared with the image intensifier (I.I) and no high voltage is required, it is possible to realize an X-ray moving image photography apparatus which is easy to handle.

In such a manner, by adopting the X-ray moving image photography apparatus using the FPD, it is possible to solve the problems such as distortion of an image which the image intensifier (I.I) has. In addition, since a still image and a moving image can be photographed with one apparatus, efficiency of X-ray image analysis can be increased, and also a load applied to a patient can be reduced. From these points, the moving image photographing using the FPD receives attention.

In the FPD, as shown in FIG. 8, X-rays 220 are applied from an X-ray source 219 to the human body 221 on the basis of an input manipulation using an X-ray source console 215 by an operator. Then, the X-rays transmitted through the human body 221 are converted into visible rays by a phosphor 201. An image based on the resultant visible rays 202 is read at the same magnification by a sensor substrate 203 which is obtained by forming amorphous silicon on a glass substrate through an amorphous silicon process.

The sensor substrate 203 is such that a plurality of pixels each including a photosensor and a switching element for ON and OFF for an output signal from the photosensor are two-dimensionally disposed. An X-ray image read by the sensor substrate 203 is outputted in the form of an electrical signal.

Moreover, after the outputted electrical signal is amplified by a signal amplification circuit 204, the electrical signal is then sent to a control substrate 224 through a relay substrate 223 to be converted into a digital signal by an analog-to-digital converter (A/D converter) 206 provided in the control substrate 224. In addition, a computer 208 for control provided in the control substrate 224 carries out the control so as to supply an electric power of a power source 207 given from an external power source 214 to the relay substrate 223, and also output a control signal to the relay substrate 223.

The relay substrate 223 can transfer the control signal outputted from the control substrate 224 to the signal amplification circuit 204, and also can form a power source required for the sensor substrate 203, a vertical drive circuit 205, and the signal amplification circuit 204.

Image data obtained as the digital signal through the A/D conversion is processed into a moving image by an image processing device 209 to be displayed on a monitor 218. All operations of an X-ray image photography apparatus are controlled by a control PC 211 having the image processing device 209, a program/control board 210, and the like disposed therein.

In addition to the above-mentioned operations, synchronization with the X-ray source 219, storage of an image, printing of an image, connection to an intra-hospital network, and the like can be carried out in accordance with the control made by the control PC 211.

Note that in the foregoing, the image data is stored in a memory device 222, an external memory device 217 or the like.

In addition, the control PC 211 is operated on the basis of an input manipulation using the sensor console 213 by an operator.

One pixel of the above-mentioned FPD is shown in FIG. 9. One pixel is constituted by a metal-insulator-semiconductor (MIS) type photosensor, and a thin film transistor (TFT) disposed as a switching element.

The pixel is formed on a glass substrate 308.

More specifically, the TFT includes a gate electrode 301 made of chromium or aluminum, an insulating film 302 formed of an amorphous silicon nitride film, a channel layer 303 made of amorphous silicon hydride, an $N^+$-type amorphous silicon layer 304 for providing ohmic contact between the channel layer 303 and a metal electrode, and a source electrode 305 and a drain electrode 306 each made of metal such as chromium or aluminum.

In addition, the MIS type photosensor is a MIS type amorphous silicon photosensor and includes a sensor lower electrode 309 made of metal such as chromium or aluminum, an insulating layer 310, as an insulating layer of the MIS type photosensor, formed of a silicon nitride film, a photoelectric conversion layer (I-type layer) 311 made of amorphous silicon hydride, an $N^+$-type amorphous silicon layer 312 for providing ohmic contact between the photoelectric conversion layer 311 and an electrode and for blocking holes generated in the photoelectric conversion layer 311, and a sensor bias line 313 which is made of aluminum, chromium or a transparent electrode material such as indium tin oxide (ITO) and which serves to supply a voltage to the MIS type photosensor.

Moreover, a protective layer 317 for protecting the MIS type photosensor and the TFT from humidity and a foreign matter, a phosphor 315 for converting radiation into visible rays, an adhesion layer 316 for adhesion between the phosphor 315 and the protective layer 317, and a phosphor protective layer 314 for protecting the phosphor 315 from humidity are formed above the TFT and the MIS type photosensor. Also, in the pixel shown in FIG. 9, a signal line 307 is connected to the drain electrode 306.

An amorphous silicon process is used during formation of the FPD because a film having a large area can be uniformly deposited to allow the characteristics of the detector to be unified.

A principle of an operation of the MIS type photosensor will hereinafter be described with reference to energy band diagrams of the MIS type photosensor shown in FIGS. 10A to 10C.

FIG. 10A shows a state during an operation for accumulation (photoelectric conversion mode) in the MIS type photosensor.

When a positive voltage is applied to a side of the sensor bias line 313 of the MIS type photosensor, holes 403 generated within the photoelectric conversion layer 311 due to the photoelectric effect move to an interface between the insulating layer 310 and the photoelectric conversion layer 311 (photoelectric conversion layer-insulating layer interface), while electrons 402 move to a side of the $N^+$-type amorphous silicon layer 312.

At this time, the holes 403 can not move to the lower electrode layer 309 side because they can not penetrate through the insulating layer 310. As a result, the holes 403 are accumulated in the photoelectric conversion layer-insulating layer interface. Thus, a voltage proportional to the amount of irradiation of light 401 and a time period of irradiation of the light 401 is generated in the MIS type photosensor.

However, if a certain amount of holes 403 are accumulated, as shown in FIG. 10B, the voltage due to the holes 403 accumulated in the photoelectric conversion layer-insulating layer interface become equal to the voltage applied to the MIS type photosensor. As a result, an electric field substantially becomes absent in the photoelectric conversion layer 311.

Under this state, the holes 403 generated in the photoelectric conversion layer 311 can not move to the photoelectric conversion layer-insulating layer interface and hence disappear. As a result, the voltage proportional to the amount of irradiation of the light 401 and a time period of irradiation of the light 401 becomes substantially absent. This state is called a saturated state.

In order to provide a state in which the voltage proportional to the amount of irradiation of the light 401 and a time period of irradiation of the light 401 is generated again for the MIS type photosensor held in the saturated state, as shown in FIG. 10C, the voltage on the sensor bias 313 has to be made lower than that in each of the states shown in FIGS. 10A and 10B to sweep out the holes accumulated in the photoelectric conversion layer-insulating layer interface. This operation is called a refresh operation.

Thus, in order that the MIS type photosensor may output the output proportional to the amount of irradiation of the light 401 and a time period of the irradiation of the light 401, it is necessary to repeatedly carry out a series of operations including the accumulation operation, the light irradiation operation, the signal reading operation, and the refresh operation (accumulation operation→light irradiation→signal reading→refresh operation).

However, for realization of the moving image photographing image pickup device using the MIS type photosensor as described above, the refresh operation becomes a problem.

This reason is as follows. That is, if all the pixels are simultaneously refreshed, the moving image will be photographed with a cycle in which the signal reading operation (accumulation operation) and the refresh operation are successively carried out (signal reading (accumulation operation)→refresh operation). However, since information in the refresh operation is not photographed, the moving image becomes unnatural.

In addition, in a case where the refresh operation is carried out whenever the reading operation is carried out several times, if the amount of irradiation of the X-rays differs depending on positions, a certain position is in the saturated state. As a result, there is encountered a problem that no gradation of the image can be obtained, and hence the moving image becomes unnatural.

DISCLOSURE OF THE INVENTION

The present invention has been made in the light of the above-mentioned background, and it is, therefore, an object of the present invention to allow a natural moving image to be obtained even when a refresh operation for sweeping out electric charges accumulated in pixels through photoelectric conversion is carried out.

A photoelectric conversion device of the present invention includes: a plurality of pixels each having, as one unit, photoelectric conversion means for converting light into an electrical signal to accumulate therein electric charges, and transfer means for transferring the electric charges accumulated in the photoelectric conversion means, the plurality of pixels being disposed in matrix; and means for sweeping out the electric charges accumulated in the photoelectric conversion means through a control line for the transfer means of the pixels disposed along a line adjacent to the photoelectric conversion means concerned.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

First Embodiment

A first embodiment according to the present invention will hereinafter be described with reference to corresponding ones of the accompanying drawings.

Figure 1:
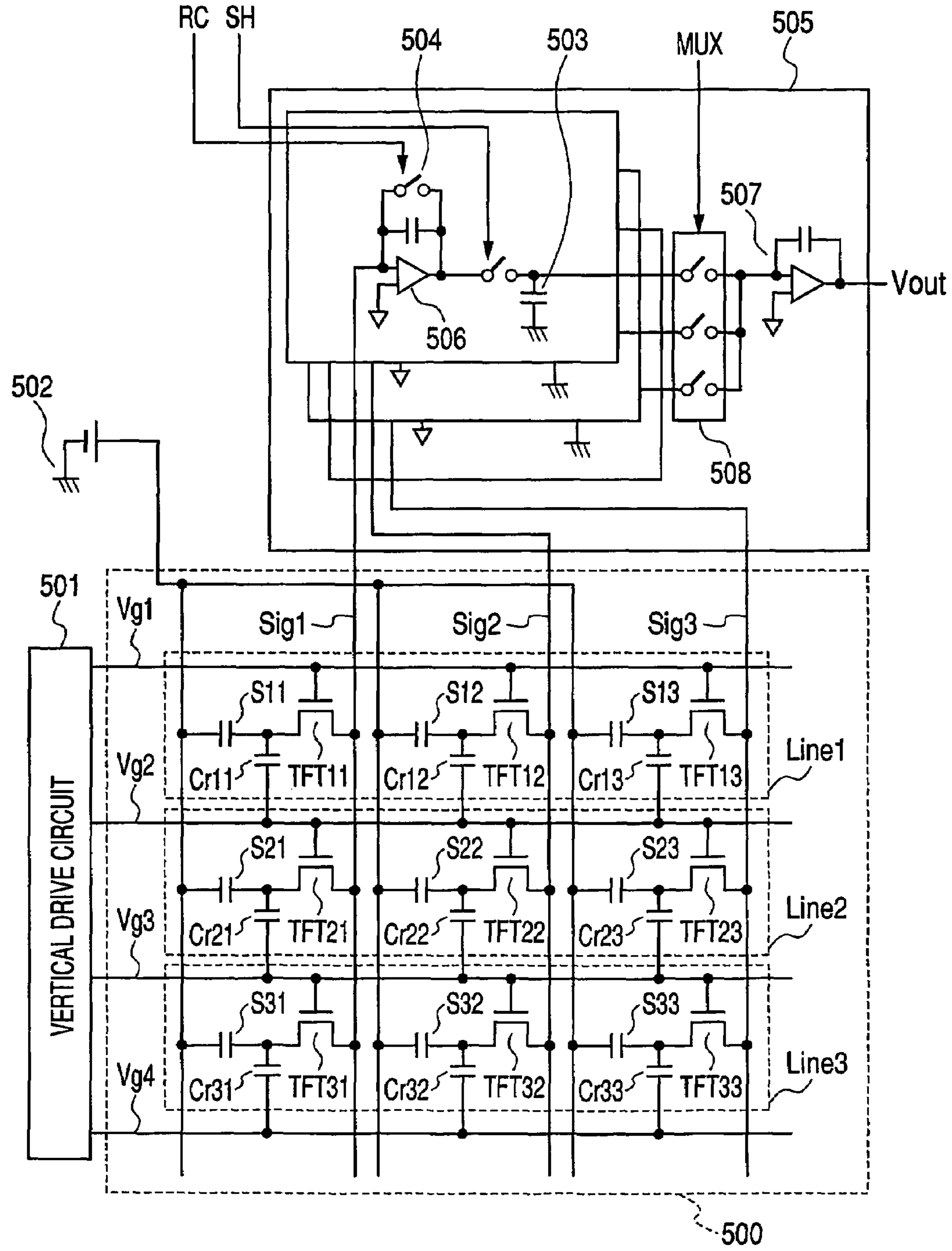
FIG. 1 is a circuit diagram showing an example of a configuration of a photoelectric conversion device according to a first embodiment of the present invention.

FIG. 1 is a circuit diagram showing an example of a configuration of a photoelectric conversion device according to this embodiment in which nine pixels are disposed in matrix of 3×3.

In FIG. 1, the photoelectric conversion device is configured so as to include: an optical detection unit 500 having TFT11 to TFT33, MIS type photosensors s11 to s33, gate lines Vg1 to Vg4, and signal lines Sig1 to Sig3 through which electrical signals from the MIS type photosensors s11 to s33 are transferred; a vertical drive circuit 501 for controlling the gate lines Vg1 to Vg4; a signal amplification circuit 505 for amplifying and transferring signals from pixels; and a sensor bias source 502 for applying a voltage required for photoelectric conversion to the MIS type photosensors s11 to s33.

The signal amplification circuit 505 includes a first stage amplifier (first stage AMP) 506 for amplifying the electrical signals from the pixels by several ten times; a reset switch (reset SW) 504 for resetting a capacitor for electric charge accumulation of the first stage AMP 506; a sample/hold capacitor 503 for holding an output of the first stage AMP 506; a multiplexer unit 508 for converting a sampled and held signal into a serial signal; and an output stage amplifier (output stage AMP) 507 for outputting the serial signal to an external circuit (not shown in FIG. 1).

A feature of the photoelectric conversion device of this embodiment is that capacitors (refreshing capacitors Cr11 to Cr33) are formed between an electrode (a sensor lower electrode 711 which will be described later) which is not made in common with sensor electrodes of the MIS type photosensors s11 to s33 and next lines in a scanning direction.

More specifically, for example, the refreshing capacitors Cr11 to Cr33 are formed between the MIS type photosensors s11 to s13 and the gate line Vg2 in FIG. 1.

Figure 10A:
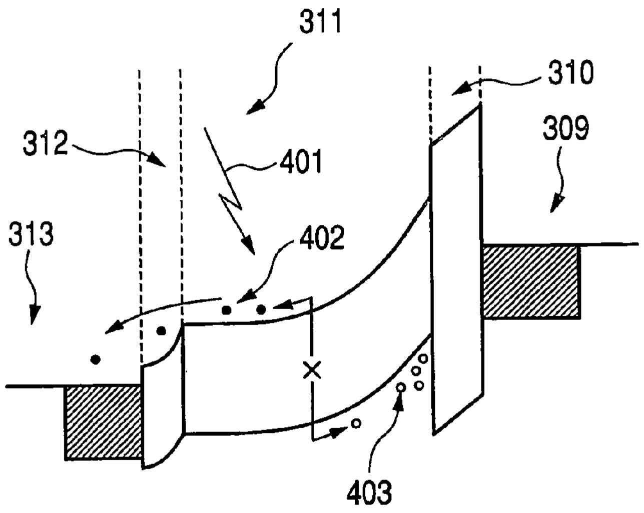
FIGS. 10A, 10B and 10C are diagrams showing energy bands of a MIS type photoelectric conversion unit according to the conventional technique.
Figure 10B:
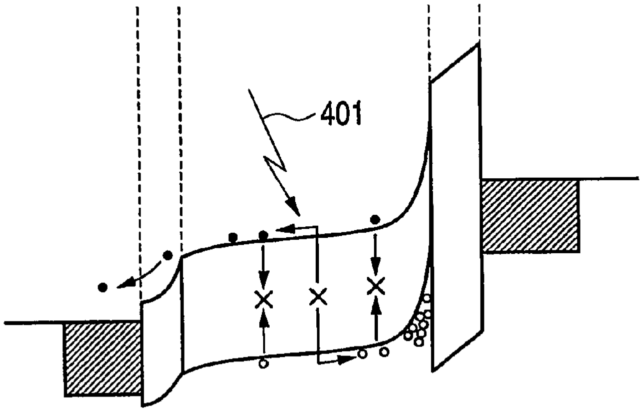
Figure 10C:
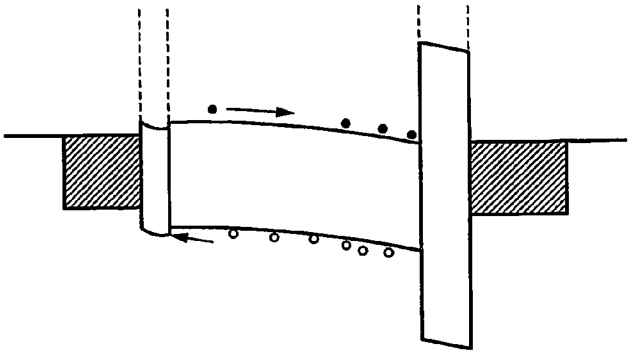

When a voltage on the gate line Vg2 shown in FIG. 1 is set to a turn-ON voltage (positive voltage) of the TFTs, an electric potential of the sensor lower electrode of the MIS type photosensors s11 to s13 is made positive through the refreshing capacitors Cr11 to Cr13. As a result, it is possible to obtain a state identical to the refresh mode shown in FIG. 10C.

That is to say, an operation mode of the MIS type photosensors of an (n−1)-th (n: natural number) line can be made the fresh mode in accordance with ON/OFF (turn-ON operation and turn-OFF operation) of the TFTs accompanying an operation for reading out electric charges from a pixel column of an n-th line in the scanning direction. This results in that the refresh operation for each scanning line becomes possible, and hence a moving image can be photographed without a break in an image.

Figure 2:
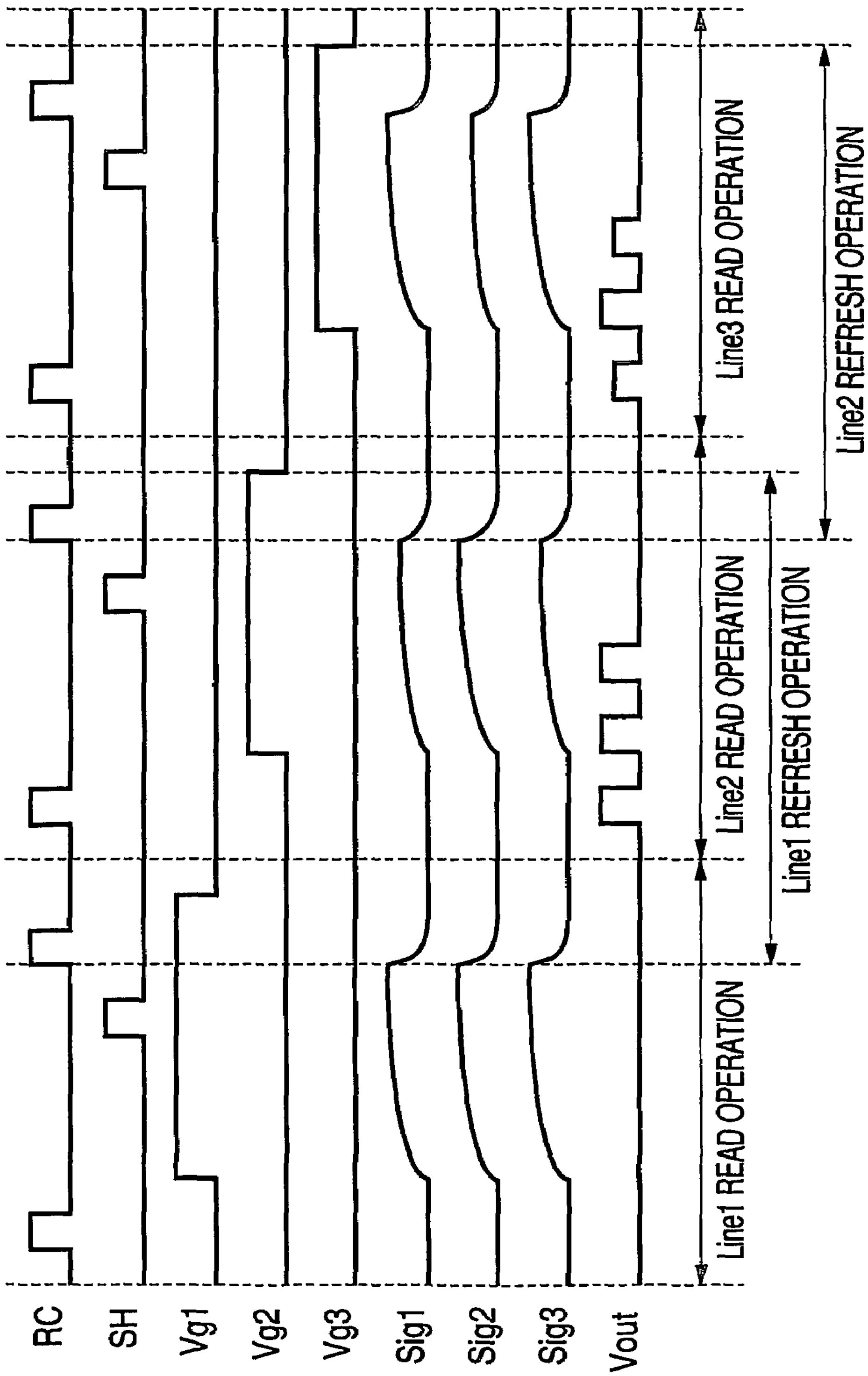
FIG. 2 is a time chart showing drive timing of a circuit constituting the photoelectric conversion device according to the first embodiment of the present invention.

FIG. 2 shows a time chart indicating drive timing of a circuit constituting the photoelectric conversion device of this embodiment shown in FIG. 1.

In order to read out the electric charges from the pixels of one line, first of all, the reset switch SW 504 of the signal amplification circuit 505 is turned ON to reset the electric potentials on the signal lines Sig1 to Sig3. By carrying out this operation, the electric potentials on the signal lines Sig1 to Sig3 are reset to the reference electric potential of the first stage AMP 506 to prevent fluctuations of the electric potentials on the signal lines Sig1 to Sig3 from exerting an influence on the image quality.

Then, in order to read out the electric charges accumulated in the MIS type photosensors s11 to s33, a voltage enough to turn ON the TFT11 to TFT13 is applied to the gate line Vg1.

When such a voltage is applied, the TFT11 to TFT13 are turned ON to transfer the electric charges accumulated in the MIS type photosensors s11 to s13 to the signal amplification circuit 505.

After a lapse of a time period enough to transfer the electric charges, a level of a signal SH is made Hi in order to charge the sample/hold capacitor 503 with an electrical signal.

Then, after a lapse of a sufficient time period, the level of the signal SH is made Low to electrically disconnect the sample/hold capacitor 503 from the first stage AMP 506.

Moreover, in order to reset the electric potential of the sensor lower electrode of the MIS type photosensors s11 to s13, a level of a signal RC is made Hi.

After completion of these operations, the voltage applied to the gate Vg1 is set to a voltage enough to turn OFF the TFT11 to TFT13 to thereby turn OFF the TFT11 to TFT13.

An operation for reading out the electric charges from the pixels of the next line is similarly carried out. The photoelectric conversion device is driven in such a manner, whereby during turn-ON/OFF of the TFTs, the MIS type photosensors of the preceding line are refreshed. That is, for example, during the operation for reading out the electric charges from the pixels of a second scanning line Line 2, the refresh operation for the MIS type photosensors of a first scanning line Line 1 is carried out.

Note that while in FIGS. 1 and 2, the photoelectric conversion device having the pixels of 3×3 has been described, the number of pixels is not limited to this number. If a sensor having a size of 43 cm×43 cm corresponding to a size of a practical sensor is manufactured using pixels each having a size of 160 μm×160 μm, then the photoelectric conversion device will have pixels of 2,688×2,688.

Moreover, in this case, the number of gate lines Vg1 to Vg4 needs to be increased so as to exceed the number of scanning lines by one (i.e., the number of gate lines Vg1 to Vg4 needs to be increased up to (the number of scanning lines +1)). In addition, the voltages with which the TFT11 to TFT33 are to be turned ON/OFF are supposed to be optimal for the formed TFT11 to TFT13.

Moreover, a degree at which the MIS type photosensors s11 to s33 are refreshed differs depending on a capacity of the refreshing capacitors Cr11 to Cr33 used to refresh the MIS type photosensors s11 to s33, and a difference between a turn-ON voltage and a turn-OFF voltage of the TFT11 to TFT33. Thus, these values are supposed to be optimized so that each photoelectric conversion device can obtain a sufficient dynamic range.

Figure 3:
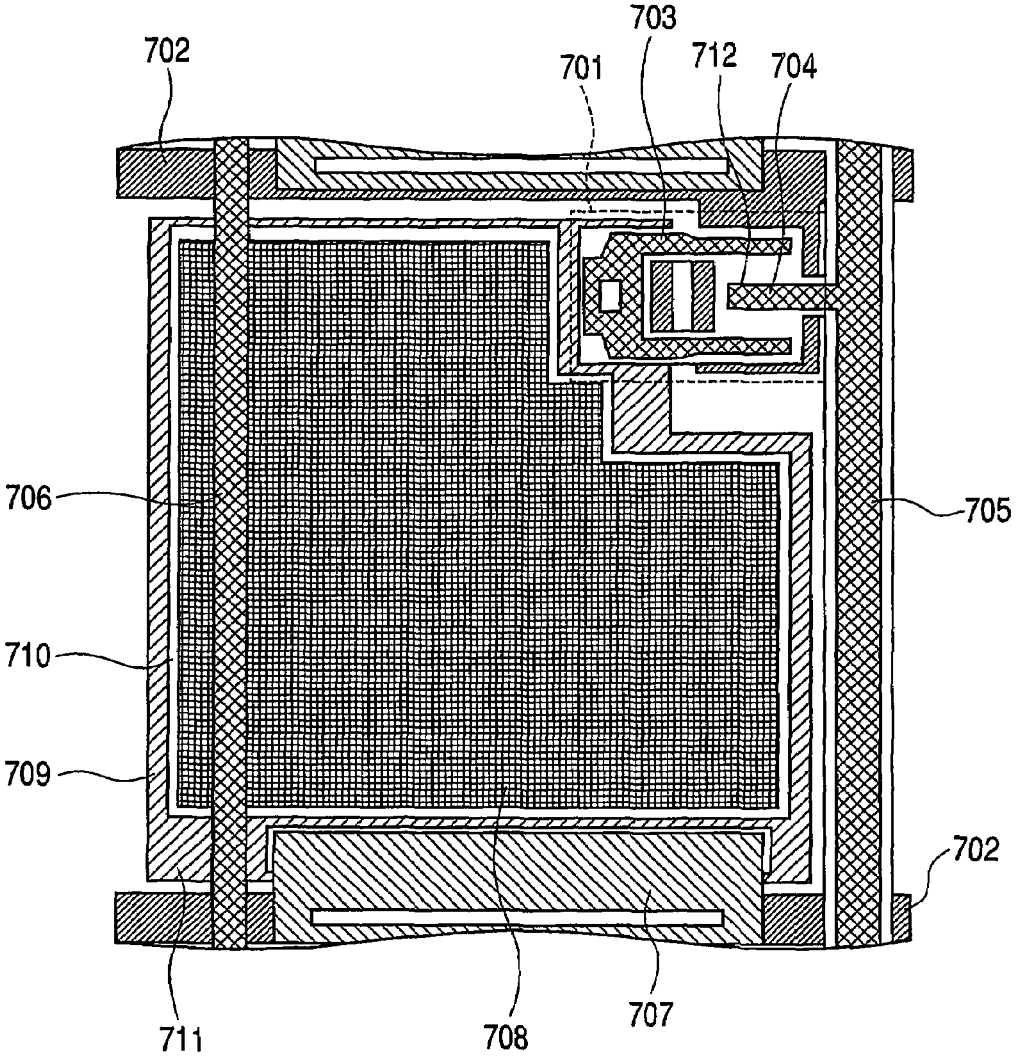
FIG. 3 is a plan view showing an example of a pattern of one pixel constituting the photoelectric conversion device according to the first embodiment of the present invention.

FIG. 3 is a plan view showing an example of a pattern of one pixel constituting the photoelectric conversion device.

Each of the MIS type photosensors s11 to s33 is structured so as to include: a sensor lower electrode 711 made of metal such as aluminum or chromium; an insulating layer 710 formed of an amorphous silicon nitride film; a photoelectric conversion layer 709 made of amorphous silicon hydride; an $N^+$-type amorphous silicon layer 708 which serves to provide ohmic contact between the photoelectric conversion layer 709 and an electrode and which acts as a hole blocking layer for blocking holes generated in the photoelectric conversion layer 709; and a sensor bias line 706 connected to the sensor bias source 502 shown in FIG. 1 for supplying a voltage to the MIS type photosensors. Note that the sensor bias line 706 is made of metal such as aluminum. Also, the $N^+$-type amorphous silicon layer 708 is made of amorphous silicon hydride for example.

In addition, each of the TFT11 to TFT33 is structured so as to include: a gate electrode 702 made of metal such as aluminum or chromium; an insulating layer 713 (not shown) formed of an amorphous silicon nitride film and becoming a gate insulating film for the TFT; a channel layer 712 made of amorphous silicon hydride; an $N^+$-type amorphous silicon layer 714 (not shown) for providing ohmic contact between the channel layer 712 and the electrode; and a drain electrode 703 and a source electrode 704 each made of metal such as aluminum.

Also, as shown in FIG. 3, a refreshing capacitor Cr 707 is formed between the gate electrode 702 made of metal such as aluminum and formed on the gate line of the next scanning line, and the sensor lower electrode layer 711.

This refreshing capacitor 707 is a capacitor having an amorphous silicon nitride film as dielectric. Note that the refreshing capacitor 707 shown in FIG. 3 corresponds to each of the refreshing capacitors Cr11 to Cr33 shown in FIG. 1.

In addition, the sensor lower electrode layer 711, the drain electrode 703 and the gate electrode 702 of each of the TFT11 to TFT33, and the electrode of the refreshing capacitor 707 are connected to one another through a contact hole.

A manufacture process (process flow) when one pixel is formed is shown in order of processes in FIGS. 4A to 4F.

Figure 4A:
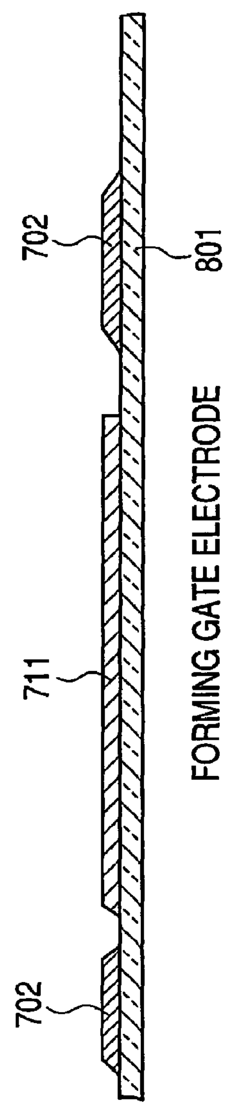
FIGS. 4A, 4B, 4C, 4D, 4E and 4F are schematic sectional views showing a manufacture process in order of processes when forming one pixel of the photoelectric conversion device according to the first embodiment of the present invention.

After a metal film made of aluminum or the like is deposited by utilizing a sputtering method onto a substrate 801, a glass substrate for example, having at least insulating property, the metal film is patterned through the photolithography process to form the gate electrode 702 and the sensor lower electrode 711 (a gate electrode formation process shown in FIG. 4A).

Figure 4B:
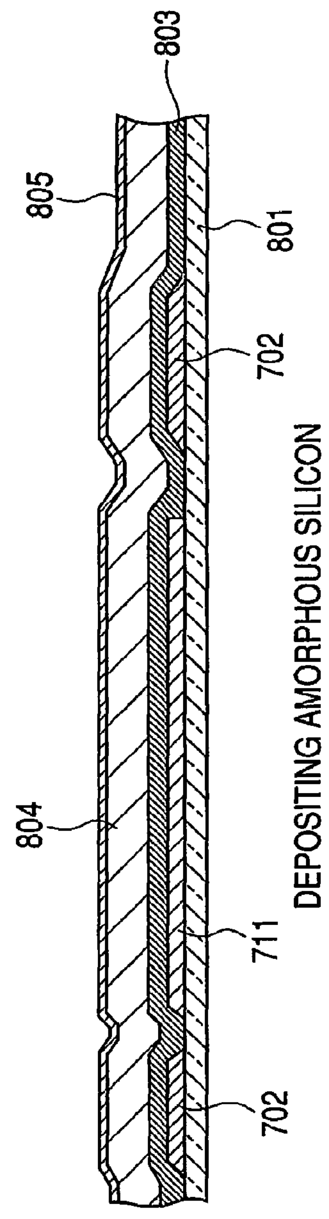
Figure 4C:
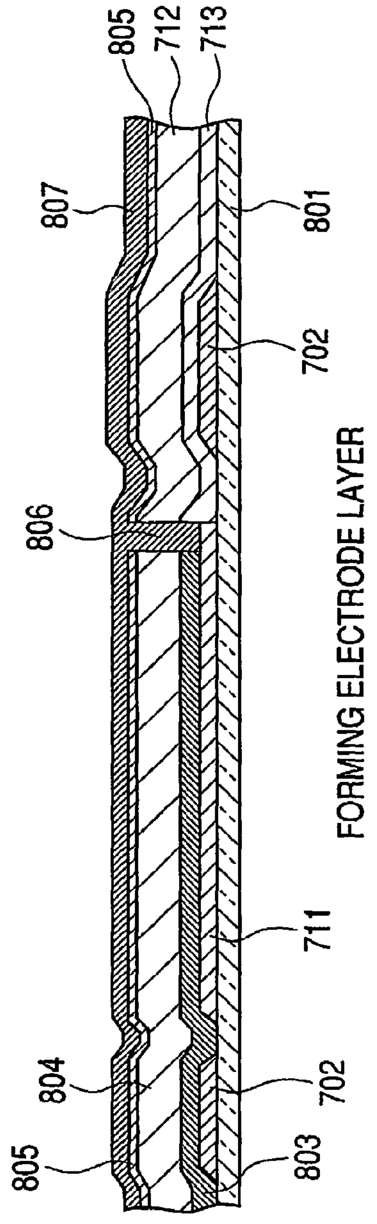

Moreover, an amorphous silicon nitride film 803, an amorphous silicon hydride layer 804, and an $N^+$-type amorphous silicon layer 805 are successively deposited onto a main surface of the substrate 801 by utilizing the chemical vapor deposition method (CVD method) or the plasma CVD method (amorphous silicon deposition process shown in FIG. 4B).

A contact hole 806 through which the drain electrode 703 of each of the TFT11 to TFT33 is intended to be connected to the sensor lower electrode 711 of the MIS photosensors s11 to s33 is formed (bored). Then, a metal layer 807 made of aluminum or the like is deposited by utilizing the sputtering method (electrode layer formation process shown in FIG. 4C). As a result, the insulating layer 713 and the channel layer 712 are formed.

Figure 4D:
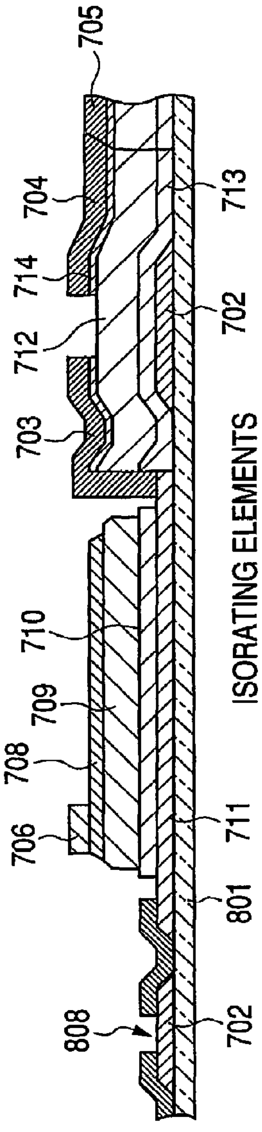

Moreover, the TFT11 to TFT33 are isolated from the MIS type photosensors s11 to s33 (elements) through the photolithography process. Thus, the drain electrode 703, the source electrode 704, the sensor bias line 706, the $N^+$-type amorphous silicon layer 708, the photoelectric conversion layer 709, and the insulating layer 710 are formed as shown in FIG. 4D. At this time, a contact hole 808 is formed (bored) so as to extend to the gate electrode 702 (element isolation process shown in FIG. 4D).

Figure 4E:
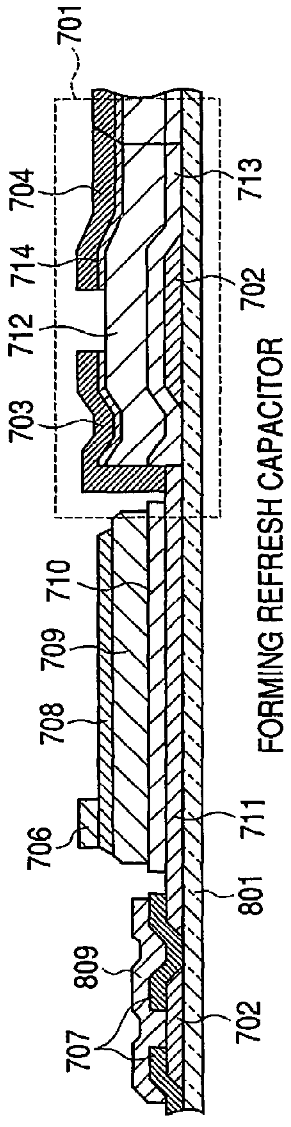
Figure 4F:
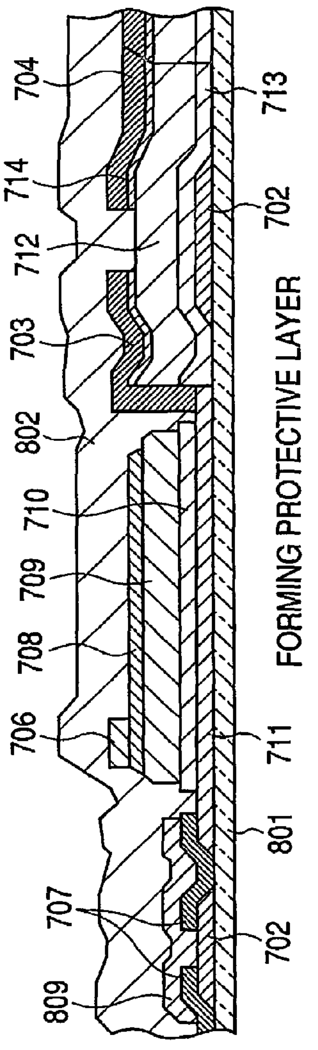

Then, an electrode 809, made of aluminum or the like, of the refreshing capacitor 707 is formed so as to cover the gate electrode 702 (refreshing capacitor formation process shown in FIG. 4E). Thereafter, for the purpose of protecting the elements from moisture and a foreign matter, a film made of amorphous silicon nitride is deposited by utilizing the CVD method or the plasma CVD method. As a result, a protective layer 802 is formed (protective layer formation process shown in FIG. 4F).

It should be noted that in the processes shown in FIGS. 4A to 4F, the thicknesses of the layers have to be determined so as to become optimal values with which the sufficient performance can be obtained as the moving image photographing photoelectric conversion device.

As described above, in this embodiment, the sensor lower electrode 711 of the MIS type photosensors is connected to the gate line Vg distributed as the next line in the scanning direction through the refreshing capacitor Cr 707, and the MIS type photosensors of the (n−1)-th line are refreshed in accordance with the turn-ON/OFF operation accompanying the operation for reading out the electric charges from the pixel column of the n-th line. As a result, the refresh operation for each scanning line (including the pixels holding the gate line Vg in common) becomes possible. Thus, it is possible to prevent the moving image from becoming unnatural due to the refresh operation as in the background art. Thus, the image is prevented from being broken off, and hence the photographing of a natural moving image becomes possible. Consequently, it is possible to realize a flat panel detector suitable for an X-ray moving image.

That is to say, by using the photoelectric conversion device of this embodiment, it is possible to provide the X-ray moving image pickup device with which a moving image having high quality and being free from distortion can be displayed in a large area (on a large screen). Hence, it is possible to contribute to enhancement of diagnosis efficiency and diagnosis precision in the medical care site.

Second Embodiment

Next, a second embodiment of the present invention will hereinafter be described. Note that this embodiment is different in configuration of a sensor bias source from the first embodiment. Thus, the same constituent elements as those of the first embodiment are designated with the same reference numerals as those in FIG. 1 through FIGS. 4A to 4F, and a detailed description thereof is omitted here.

Figure 5:
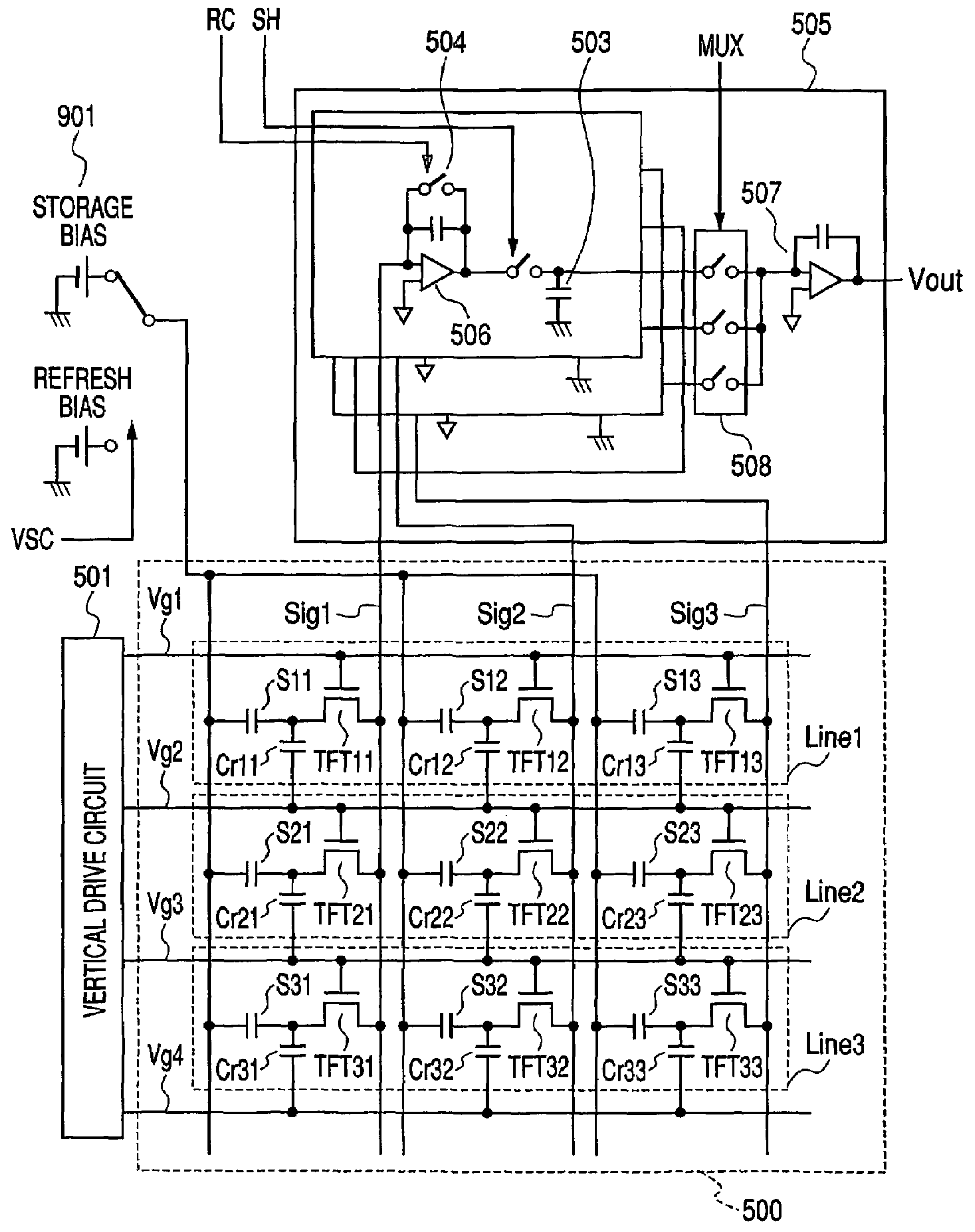
FIG. 5 is a circuit diagram showing an example of a configuration of a photoelectric conversion device according to a second embodiment of the present invention.

FIG. 5 is a circuit diagram showing an example of a configuration of a photoelectric conversion device according to this embodiment.

A feature of the photoelectric conversion device shown in FIG. 5 is that two kinds of sensor bias sources are added to the circuit configuration of the photoelectric conversion device according to the first embodiment suitable for the moving image photography apparatus to allow a large dynamic range to be ensured in a still image.

The still image requires a larger dynamic range than that of the moving image. As described above, in order that the MIS type photosensor may maintain desired sensitivity and a dynamic range, the refresh operation is required. In particular, in order to ensure a large dynamic range, it is desirable that a difference between a sensor bias voltage during the accumulation (during the photoelectric conversion mode) and a sensor bias voltage during the refresh operation is large.

However, in case of the refresh method in the first embodiment, there is a possibility that when the still image is photographed, a sufficient dynamic range can not be ensured. Thus, in a case where the still image is obtained, a method including collectively refreshing all the pixels to carry out photographing is desirable.

From the above reasons, as shown in FIG. 5, in this embodiment, a sensor bias source 901 is designed so as to have two power source voltages, i.e., an accumulation bias voltage as a voltage to be supplied in the accumulation operation, and a refresh bias voltage as a voltage to be supplied in the refresh operation. The refresh operation is carried out before photographing of the still image using the sensor bias source 901 having such a configuration. As a result, the moving image photography apparatus capable of ensuring a dynamic range enough to photograph the still image can be realized.

Figure 6:
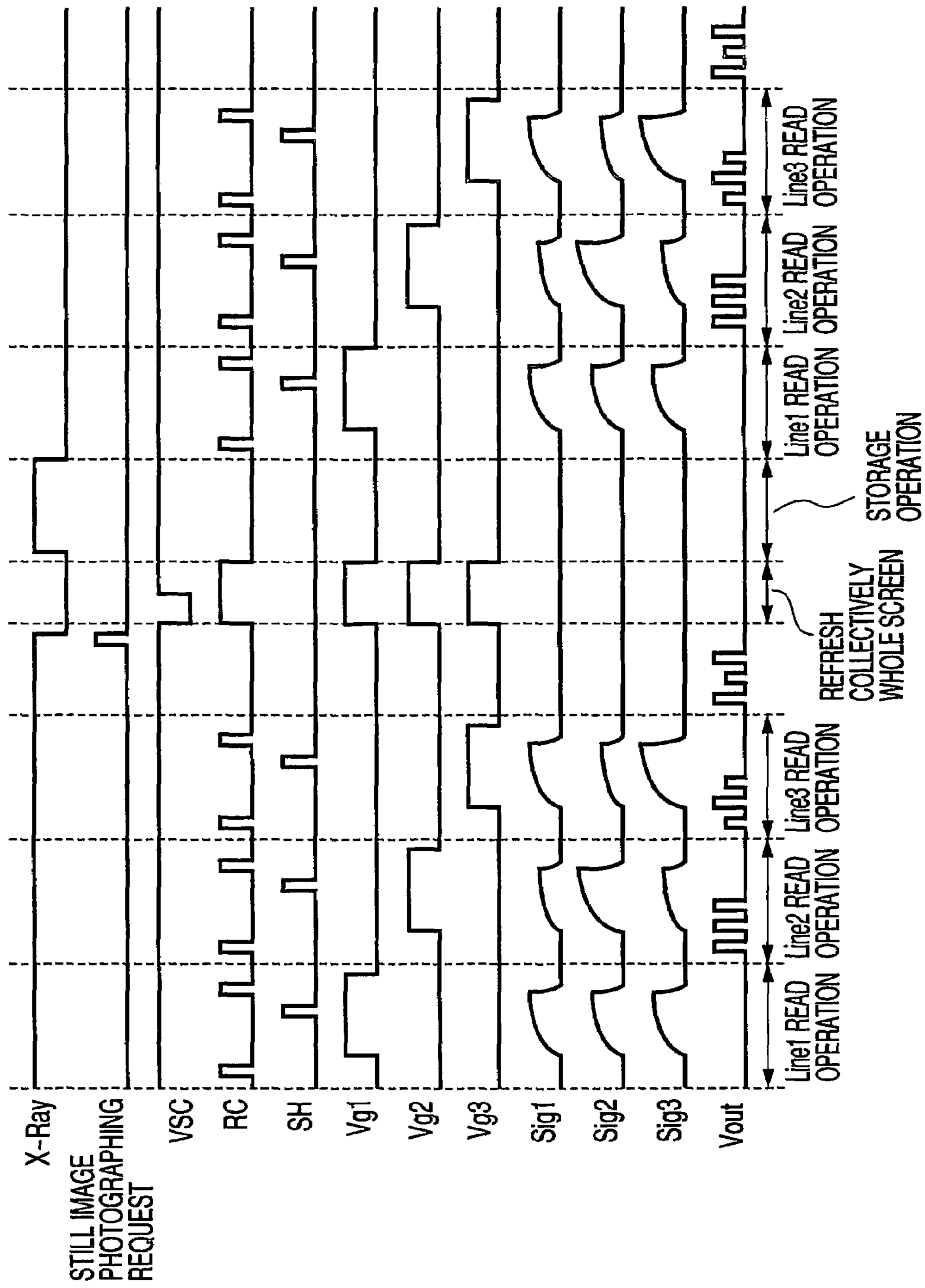
FIG. 6 is a time chart showing drive timing of a circuit constituting the photoelectric conversion device according to the second embodiment of the present invention.
Figure 7:
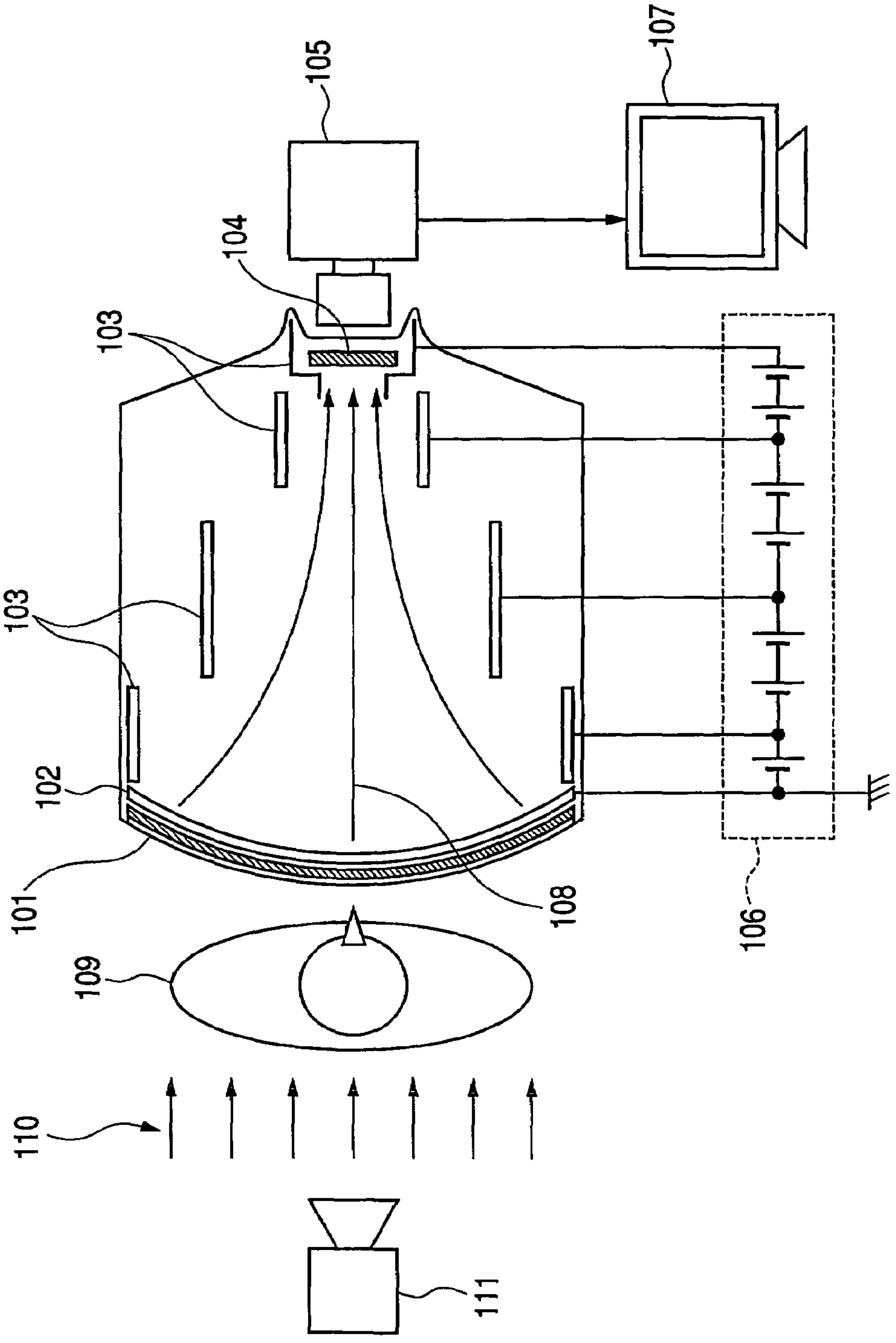
FIG. 7 is a view showing a structure of an image intensifier according to the conventional technique.
Figure 8:
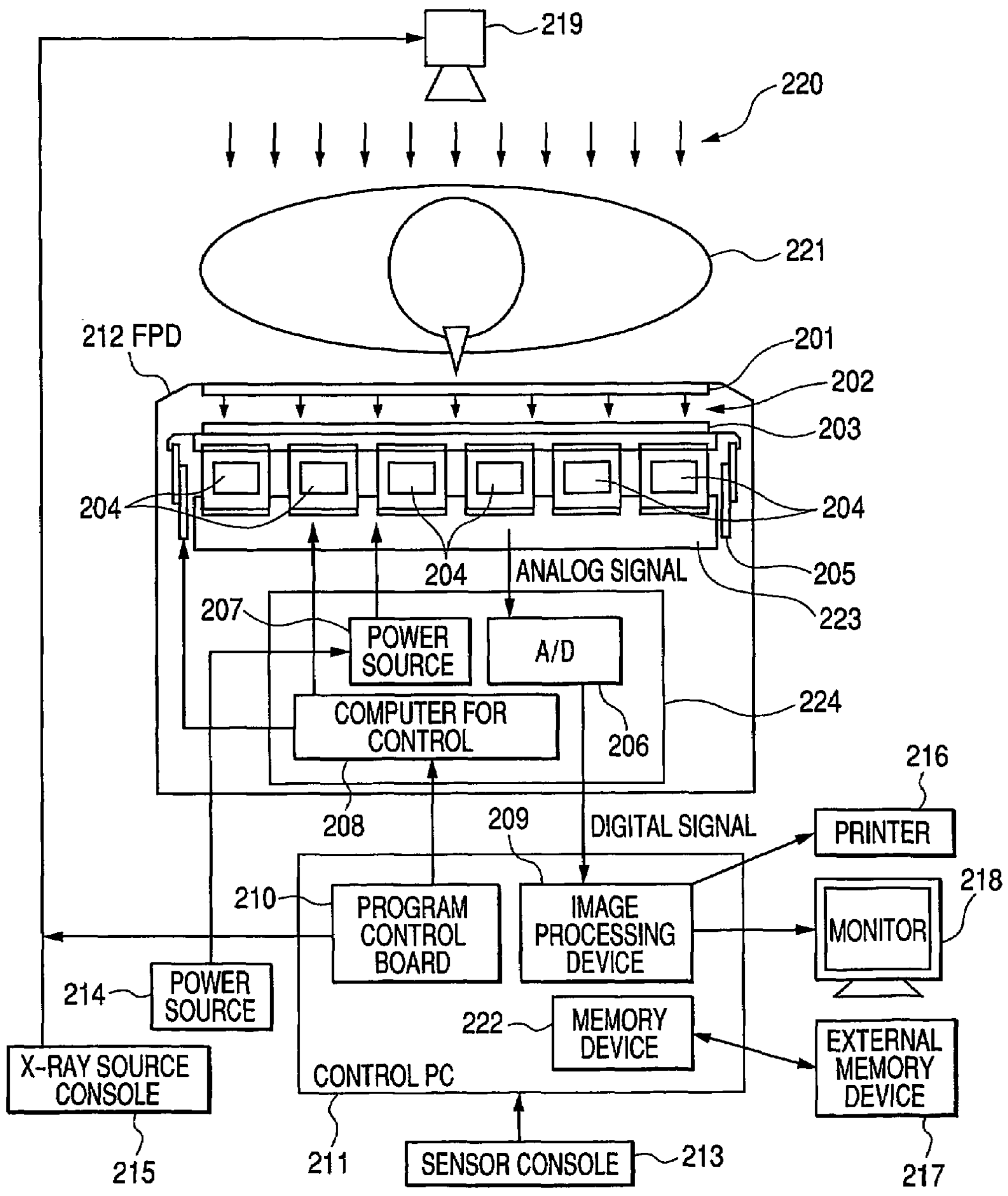
FIG. 8 is a view showing a structure of a flat panel detector according to the conventional technique.
Figure 9:
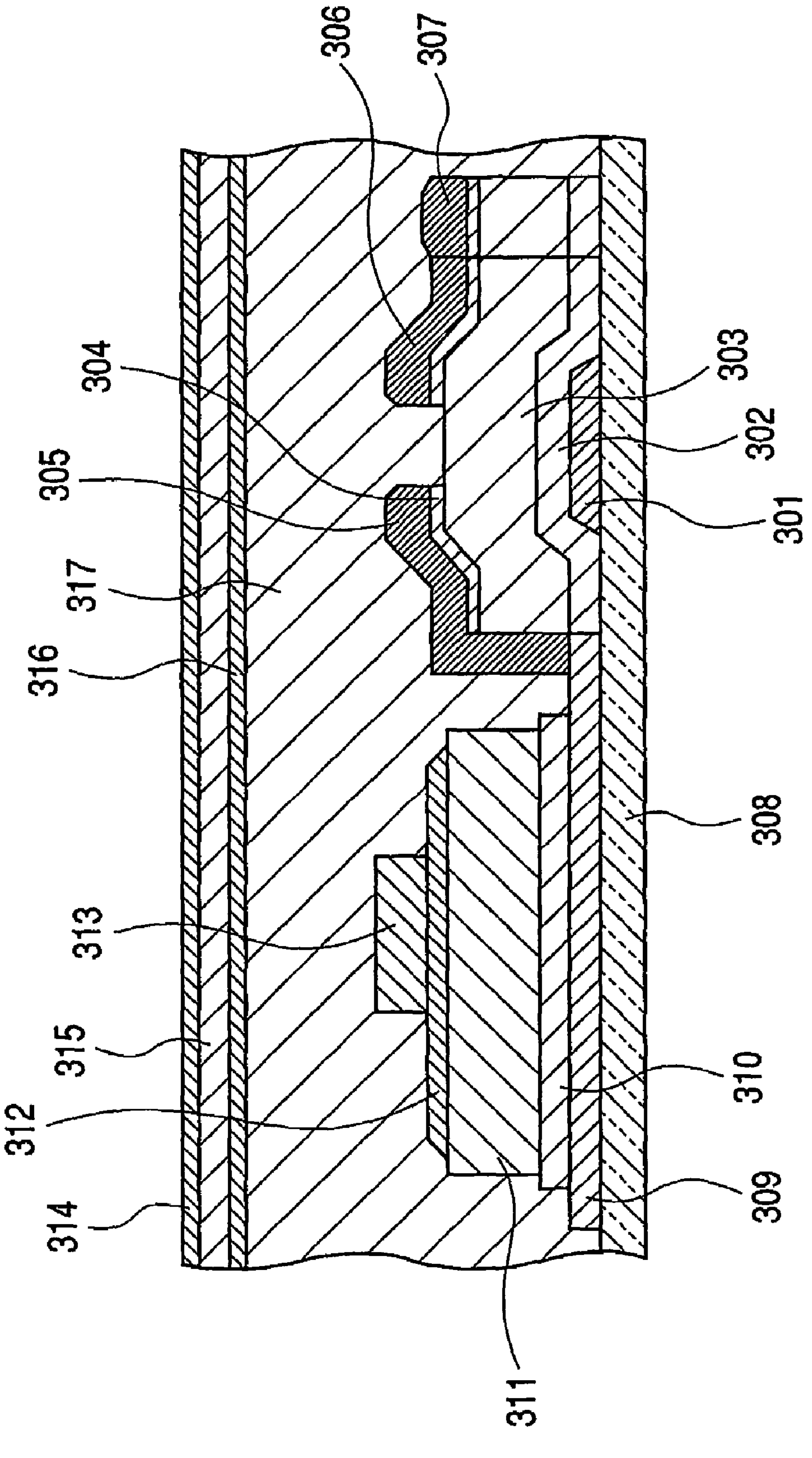
FIG. 9 is a sectional view showing a structure of one pixel according to the conventional technique.

FIG. 6 shows a time chart indicating drive timing in a circuit constituting the photoelectric conversion device according to this embodiment shown in FIG. 5.

A doctor or an engineer photographs a still image at desired timing while looking at a moving image. Upon input of a request to photograph the still image to the image pickup device, the image pickup device completes the operation for photographing the moving image to enter the refresh operation.

In the refresh operation at this time, a level of the signal VSC is made Low, the voltage of the sensor bias source 901 is switched over to the refresh voltage (refresh bias voltage), and at the same time, all the TFT11 to TFT33 are turned ON to refresh all the pixels. At this time, the X-rays are not emitted.

After completion of the refresh operation, the desired amount of X-rays are emitted. At this time, the TFT11 to TFT33 of all the pixels are turned OFF to accumulate the electric charges in the sensors. Then, after completion of the emission of the X-rays, the reading operation is carried out. The reading operation is carried out at the same timing as that in the photographing of the moving image. For this reason, the moving image can be immediately photographed.

Note that in order to avoid the unnatural moving image due to the refresh operation, similarly to the first embodiment, it is necessary to refresh corresponding ones of the MIS type photosensors s11 to s33 every scanning line.

The refresh is carried out every scanning line, i.e., every group of pixels holding the gate line Vg in common to allow the refresh to be carried out while the operation for reading out the electric charges from the pixels of the next line is carried out. As a result, similarly to the first embodiment, unnaturalness of the moving image due to the refresh is solved.

As described above, in this embodiment, when a request to photograph the still image is made, after the bias voltage of the sensor bias source 901 is switched over to the refresh bias voltage and all the TFT11 to TFT33 are turned ON to refresh all the pixels, the still image is photographed. Thus, by using the photoelectric conversion device of this embodiment, in addition to the effect of the first embodiment, there is offered an effect of realizing the moving image photography apparatus which is capable of ensuring the dynamic range enough to photograph the still image.

Other Embodiments of the Invention

An embodiment in which a program code of a software for realizing the functions of the above-mentioned embodiments is supplied to a computer within an apparatus or a system connected to various kinds of devices so as to operate the various kinds of devices in order to realize the functions of the above-mentioned embodiments, and the various kinds of devices are operated in accordance with a program stored in the computer (CPU or MPU) of the system or apparatus to thereby implement the invention also comes within the scope of the present invention.

Also, in this case, the program code itself of the software realizes the functions of the above-mentioned embodiments. Hence, the program code itself and means for supplying the program code to the computer, i.e., a recording medium storing therein such a program code constitute the present invention. As for the recording medium for storing such a program code, for example, there may be used a flexible disc, a hard disc, an optical disc, a magneto-optical disc, a CD-ROM, a magnetic tape, a nonvolatile memory card, a ROM or the like.

In addition, it is to be understood that in a case as well where not only the computer executes the program code supplied thereto to realize the functions of the above-mentioned embodiments, but also the program code cooperates with an operating system (OS) operating in the computer, other application software or the like to thereby realize the functions of the above-mentioned embodiments, such a program code comes as an embodiment of the present invention within the scope of the present invention.

Moreover, in a case as well where after the supplied program code is stored in a memory provided in a function expanded board of the computer or a function expanded unit connected to the computer, a CPU or the like provided in the function expanded board or the function expanded unit executes a part of or all of an actual processing in accordance with an instruction indicated by the program code, and the functions of the above-mentioned embodiments are realized through execution of a part of or all of an actual processing, such a program code comes within the scope of the invention.

As set forth hereinabove, according to the present invention, a plurality of pixels each having, as one unit, photoelectric conversion means for converting light into electric charges to accumulate therein the electric charges and transfer means for transferring the electric charges accumulated in the photoelectric conversion means are disposed in matrix, and the electric charges accumulated in the photoelectric conversion means are swept out using a control line for the transfer means of the pixels disposed along a line adjacent to the photoelectric conversion means concerned. As a result, the refresh operation can be carried out every line, and hence it is possible to prevent the moving image from becoming unnatural due to the refresh operation as in the background art. Thus, the image is prevented from being broken off to allow a natural moving image to be photographed. Consequently, it is possible to provide the moving image pickup device which is capable of displaying the moving image having high image quality and being free from distortion in a large area (on a large screen).

As many apparently widely different embodiments of the present invention can be made without departing from the spirit and scope thereof, it is to be understood that the invention is not limited to the specific embodiments thereof except as defined in the claims.

The invention claimed is:

1. A photoelectric conversion device, comprising:

a plurality of pixels each having, as one unit, photoelectric conversion means for converting light into an electrical signal to accumulate therein electric charges, and transfer means for transferring the electric charges accumulated in said photoelectric conversion means, said plurality of pixels being disposed in a matrix; and means for sweeping out the electric charges accumulated in said photoelectric conversion means through a control line for said transfer means of said pixels disposed along a line adjacent to said photoelectric conversion means concerned, wherein said photoelectric conversion means has at least a first electrode and a second electrode connected to said transfer means, said means for sweeping out uses a capacitor between said second electrode of said photoelectric conversion means and said control line for said transfer means of said pixels disposed along the line adjacent to said photoelectric conversion means, and a voltage change of said control line in a reading operation for said pixels disposed along the adjacent line, to sweep out the electric charges accumulated in said photoelectric conversion means.

2. A photoelectric conversion device according to claim 1, wherein said photoelectric conversion means is an MIS type photosensor having an insulating layer disposed between said first and second electrodes, and a photoelectric conversion layer disposed between said insulating layer and said second electrode.

3. A photoelectric conversion device according to claim 2, said transfer means has at least a gate electrode, a gate insulating layer, a channel layer, a source electrode and a drain electrode, one of said source and drain electrodes is connected to said first electrode of said photoelectric conversion means and the other of said source and drain electrodes is connected to a signal line through which an electric signal is transferred.

4. A photoelectric conversion device according to claim 3, further comprising:

bias means for supplying a voltage required when the light is converted into the electrical signal to said photoelectric conversion means, wherein said bias means is connected to said second electrode of said photoelectric conversion means;

control signal supply means for supplying a control signal used to control an operation for transferring the electrical signal obtained through the conversion by said photoelectric conversion means to said control line; and signal amplification means for amplifying the electrical signal transferred from said photoelectric conversion means in accordance with the control signal supplied from said control signal supply means to said control line, wherein said signal amplification means is connected to said signal line.

5. A photoelectric conversion device according to claim 4, wherein said bias means supplies a voltage to said photoelectric conversion means, a value of the voltage when the electric charges are accumulated in said photoelectric conversion means being different from a value of the voltage when the electric charges accumulated in said photoelectric conversion means are swept out.

6. The photoelectric conversion device according to claim 4, wherein the means for sweeping out uses said capacitor and the voltage change to sweep out the electric charges accumulated in said photoelectric conversion means, after that said signal amplification means resets the first electrode of said photoelectric conversion means.

7. A photoelectric conversion device according to claim 1, wherein said photoelectric conversion means includes a wavelength conversion unit and serves to convert light having a wavelength obtained through wavelength conversion by said wavelength conversion unit into an electrical signal to accumulate the electric charges.

8. A photoelectric conversion device according to claim 7, wherein said wavelength conversion unit includes a phosphor for converting ionizing radiation into visible rays.

9. A photoelectric conversion device according to claim 1, wherein an electrical signal amplifier and a vertical scanning circuit suitable for photographing of a moving image are connected to said plurality of pixels disposed in a matrix, and said electrical signal amplifier and said vertical scanning circuit are driven by utilizing a method suitable for the photographing of the moving image.

10. A photoelectric conversion device according to claim 1, further comprising dynamic range ensuring means for allowing said photoelectric conversion means to ensure a dynamic range required for photographing a still image.

11. A radiation moving image photography apparatus, comprising a photoelectric conversion device as claimed in any one of claims 1 to 10, wherein a moving image is photographed using the photoelectric conversion device.

12. A method of controlling a photoelectric conversion device including a plurality of pixels each having, as one unit, photoelectric conversion means having at least first and second electrodes for converting light into an electrical signal to accumulate therein electric charges, and transfer means connected to the second electrode of the photoelectric conversion means for transferring the electric charges accumulated in the photoelectric conversion means, the plurality of pixels being arranged in a matrix, the method comprising the step of:

executing a sweeping processing using a capacitor between the second electrode of the photoelectric conversion means and the control line for the transfer means of the pixels disposed along the line adjacent to the photoelectric conversion means, and a voltage change of the control line in a reading operation for the pixels disposed along the adjacent line, to sweep out the electric charges accumulated in the photoelectric conversion means.

13. A computer readable recording medium recording therein a computer program for a computer control of a photoelectric conversion device including a plurality of pixels each having, as one unit, photoelectric conversion means having at least first and second electrodes for converting light into an electrical signal to accumulate therein electric charges, and transfer means connected to the second electrode of the photoelectric conversion means for transferring the electric charges accumulated in the photoelectric conversion means, the plurality of pixels being disposed in a matrix, wherein the computer controls the photoelectric conversion device to execute a sweeping processing using a capacitor between the second electrode of the photoelectric conversion means and the control line for the transfer means of the pixels disposed along the line adjacent to the photoelectric conversion means, and a voltage change of the control line in a reading operation for the pixels disposed along the adjacent line, to sweep out the electric charges accumulated in the photoelectric conversion means.

14. A photoelectric conversion device, comprising:

a plurality of pixels each having, as one unit, photoelectric conversion means for converting light into an electrical signal to accumulate therein electric charges, and transfer means for transferring the electric charges accumulated in said photoelectric conversion means, said plurality of pixels being disposed in a matrix; and control signal supply means for supplying a control signal to control lines for controlling an operation for transferring the electrical signal obtained through the conversion by said photoelectric conversion means, wherein said photoelectric conversion means has at least a first electrode and a second electrode connected to said transfer means, the electric charges accumulated in said photoelectric conversion means are swept out using a capacitor between said second electrode of said photoelectric conversion means and said control line for said transfer means of said pixels disposed along the line adjacent to said photoelectric conversion means, and a voltage change of said control line in a reading operation for said pixels disposed along the adjacent line.

* * * * *